United States Patent
Klassen (10) Patent No.: US 8,867,065 B2
(45) Date of Patent: Oct. 21, 2014

(54) PAGE PARALLEL RIP PRINTING METHODS AND SYSTEMS

(75) Inventor: R. Victor Klassen, Webster, NY (US)

(73) Assignee: Xerox Corporation, Norwalk, CT (US)

(*) Notice: Subject to any disclaimer, the term of this patent is extended or adjusted under 35 U.S.C. 154(b) by 791 days.

(21) Appl. No.: 12/624,761

(22) Filed: Nov. 24, 2009

(65) Prior Publication Data

US 2011/0122433 A1 May 26, 2011

(51) Int. Cl.
G06F 3/12 (2006.01)
H04N 1/00 (2006.01)
G06K 15/00 (2006.01)

(52) U.S. Cl.
CPC ............ *G06F 3/1208* (2013.01); *G06F 3/1288* (2013.01); *G06F 3/124* (2013.01); *G06F 3/1252* (2013.01); *G06F 3/1281* (2013.01); *G06F 3/1247* (2013.01); *G06F 3/1213* (2013.01); *G06F 3/1215* (2013.01); *G06F 3/1241* (2013.01)
USPC ......... 358/1.15; 358/1.13; 358/1.9; 358/1.14; 382/304; 345/601; 345/602

(58) Field of Classification Search
USPC ........... 358/1.13, 1.14, 1.9; 1/1; 345/601, 602
See application file for complete search history.

(56) References Cited

U.S. PATENT DOCUMENTS

| | | | |
|---|---|---|---|
| 5,748,337 A | 5/1998 | Minamizawa | |
| 5,819,014 A | 10/1998 | Cyr et al. | |
| 6,657,741 B1 | 12/2003 | Barry et al. | |
| 6,775,729 B1 | 8/2004 | Matsuo et al. | |
| 6,973,286 B2 | 12/2005 | Mandel et al. | |
| 7,009,734 B2 * | 3/2006 | Suwa et al. | 358/1.9 |
| 7,161,705 B2 | 1/2007 | Klassen | |
| 7,342,686 B2 * | 3/2008 | Barry | 358/1.9 |
| 2003/0007180 A1 | 1/2003 | Urasawa et al. | |
| 2003/0007181 A1 | 1/2003 | Nishikawa et al. | |
| 2003/0233370 A1 * | 12/2003 | Barabas et al. | 707/103 R |
| 2004/0184061 A1 * | 9/2004 | Christiansen | 358/1.13 |
| 2004/0196496 A1 * | 10/2004 | Klassen | 358/1.15 |
| 2004/0196497 A1 | 10/2004 | Klassen et al. | |
| 2005/0019077 A1 * | 1/2005 | Hatta et al. | 400/62 |
| 2006/0092463 A1 * | 5/2006 | Ahn | 358/1.15 |

* cited by examiner

Primary Examiner — Akwasi M Sarpong
(74) Attorney, Agent, or Firm — Fay Sharpe LLP (57) ABSTRACT

Disclosed are methods and apparatus for operating a page parallel RIP printing system including a plurality of image marking engines (IMEs). According to an exemplary method, a print job is split into a plurality of job chunks, each job chunk grouped by its destination IME; and the job chunks are processed into a printer ready format by a plurality of RIP nodes associated with the job chunk group's respective destination IME.

22 Claims, 4 Drawing Sheets

PAGE PARALLEL RIP PRINTING METHODS AND SYSTEMS

CROSS REFERENCE TO RELATED PATENTS AND APPLICATIONS

The following related patents and applications are totally incorporated herein in their entirety:

U.S. patent application Ser. No. 12/467,369, by Klassen, entitled "RESOURCE PARTITIONING IN A PRINT SYSTEM," filed May 18, 2009.

U.S. Patent Application Publication No. US 2004/0196496, by Klassen, entitled "PARALLEL PRINTING SYSTEM," published Oct. 7, 2004.

U.S. Patent Application Publication No. US 2004/0196497, by Klassen et al., entitled "PARALLEL PRINTING SYSTEM HAVING FLOW CONTROL IN A VIRTUAL DISK TRANSFER SYSTEM," published Oct. 7, 2004.

U.S. Pat. No. 7,161,705, by Klassen, entitled "PARALLEL PRINTING SYSTEM HAVING MODES FOR AUTO-RECOVERY, AUTO-DISCOVERY OF RESOURCES, AND PARALLEL PROCESSING OF UNPROTECTED POSTSCRIPT JOBS," issued Jan. 9, 2007.

BACKGROUND

When a document is printed using multiple print engines, especially when printed duplex on a continuous feed machine, pages or sides printed on different print engines may have different color appearance, unless the color rendering is altered to take into account printer-to-printer differences. One known system provides pages that are RIPped to an engine-neutral space and then once the engine is known, they are color transformed according to the engine. To do this well requires storing continuous tone data, and also applying the color transform to raster data.

For example, some systems render pages to (compressed) bitmaps, while converting the colors to an engine-neutral color space, and then color-convert the output bitmaps to account for inter-engine differences. While this can be advantageous for a particular application, if it is difficult to determine ahead of time which engine will be used for which page, there are disadvantages to this approach as well. One disadvantage is that every pixel must be converted, even though there may be large areas of a single color. Once the page has been converted to a bitmap, it is more difficult to detect regions of constant color. Another disadvantage is that the page must be rasterized in continuous tone, rather than one-bit deep. It is common for high speed systems to use a binary image path, in which colors are converted to binary through halftoning early in the process, thereby reducing the amount of data to be transferred in later stages. Once an image is converted to binary it is difficult (but not impossible) to change its tone scale, and even more difficult to apply a color space transformation that includes inter-separation dependencies.

When a job is printed by multiple print engines, there is the opportunity for pages to exhibit mis-match due to the difference between engines. This difference may be compensated through calibration or profiling techniques, to make the pages match (or at least more nearly than without compensation). This disclosure and the embodiments described herein, describe an efficient way of applying color compensation in a page parallel RIP system. Such a system includes the arrangement of multiple printers used to print a document, where the output stacks are arranged in such a way that they may readily be combined. Further, arrangements are provided for continuous feed systems in which two engines are connected so that one engine prints front while the other prints back sides of a document. It is with reference to this last case that the present disclosure is described, however other embodiments are possible. In particular, where two engines are referenced, or "first" and "second" are mentioned, more engines could be used.

The subject disclosure relates to printing systems, their architecture and processing steps and, more particularly, to producing electronic images in a manner to drive digital printers more efficiently and with image appearance consistency.

INCORPORATION BY REFERENCE

The following patents and applications are totally incorporated herein by reference:

U.S. Pat. No. 5,748,337, by Minamizawa, entitled "FACSIMILE DEVICE HAVING A PRINTING FUNCTION," issued May 5, 1998.

U.S. Pat. No. 5,819,014, by Cyr et al., entitled "PARALLEL DISTRIBUTED PRINTER CONTROLLER ARCHITECTURE," issued Oct. 6, 1998.

U.S. Pat. No. 6,657,741, by Barry et al., entitled "MULTIPLE PRINT ENGINE SYSTEM WITH SELECTIVELY DISTRIBUTED RIPPED PAGES," issued Dec. 2, 2003.

U.S. Pat. No. 6,775,729, by Matsuo et al., entitled "PERIPHERAL DEVICE, PERIPHERAL DEVICE CONTROL METHOD, PERIPHERAL DEVICE CONTROL SYSTEM, STORAGE MEDIUM FOR STORING PERIPHERAL DEVICE CONTROL PROGRAMS, SENDING DEVICE FOR SENDING PERIPHERAL DEVICE CONTROL PROGRAMS, AND PERIPHERAL DEVICE CONTROL PROGRAM PRODUCT," issued Aug. 10, 2004.

U.S. Pat. No. 6,973,286, by Mandel et al., entitled "HIGH PRINT RATE MERGING AND FINISHING SYSTEM FOR PARALLEL PRINTING," issued Dec. 6, 2005.

U.S. Pat. No. 7,342,686, by Barry et al., entitled "METHOD AND APPARATUS FOR PROVIDING A COLOR-BALANCED MULTIPLE PRINT ENGINE," issued Mar. 11, 2008.

U.S. Patent Application Publication No. 2003/0007180, by Urasawa et al., entitled "PRINTING CONTROL METHOD FOR LONG PAGES," published Jan. 9, 2003.

U.S. Patent Application Publication No. 2003/0007181, by Nishikawa et al., entitled "INFORMATION PROCESSING APPARATUS AND CONTROL METHOD THEREFOR," published Jan. 9, 2003.

U.S. Patent Application Publication No. 2003/0233370, by Barabas et al., entitled "MAINTAINING A RELATIONSHIP BETWEEN TWO DIFFERENT ITEMS OF DATA," published Dec. 18, 2003.

U.S. Patent Application Publication No. 2004/0184061, by Christiansen, entitled "SYSTEMS AND METHODS FOR RECOVERY OF A FAILED RASTER IMAGE PROCESSOR PARTITION," published Sep. 23, 2004.

BRIEF DESCRIPTION

In one embodiment of this disclosure, described is a method of operating a printing system including a plurality of destination image marking engines (IMEs), each IME associated with a respective plurality of RIP nodes, the method comprising splitting a print job into a plurality of job chunks, each job chunk including one or more pages to be printed using only one of the plurality of destination IMEs; assigning each of the job chunks to one of the plurality of RIP nodes associated with the job chunk's respective destination IME for processing of the job chunks into a printer-ready format; processing a plurality of the respectively assigned job chunks into the printer-ready format, and printing the printer-ready job chunks on the respective destination image marking engines.

In another embodiment of this disclosure, described is a computer program product comprising a computer usable data carrier storing instruction that, when executed by a computer, cause the computer to perform a method of operating a printing system including a plurality of destination image marking engines (IMEs), each IME associated with a respective plurality of RIP nodes, the method comprising splitting a print job into a plurality of job chunks, each job chunk including one or more pages to be printed using only one of the plurality of destination IMEs; assigning each of the job chunks to one of the plurality of RIP nodes associated with the job chunk's respective destination IME for processing of the job chunks into a printer-ready format; processing a plurality of the respectively assigned job chunks into the printer-ready format, and printing the printer-ready job chunks on the respective destination image marking engines.

In still another embodiment of this disclosure, described is a printing system comprising a plurality of destination image marking engines (IMEs) each IME associated with a respective plurality of RIP nodes; and a controller operatively connected to the plurality of IMEs, the controller configured to execute instructions to perform a method of operating the printing system comprising splitting a print job into a plurality of job chunks, each job chunk including one or more pages to be printed using only one of the plurality of destination IMEs; assigning each of the job chunks to one of the plurality of RIP nodes associated with the job chunk's respective destination IME for processing of the job chunks into a printer-ready format; processing a plurality of the respectively assigned job chunks into the printer-ready format; and, printing the printer-ready job chunks on the respective destination image marking engines.

DETAILED DESCRIPTION

The subject disclosure uses an intermediate level of parallelism herein defined as "chunk" parallelism. A chunk of print job data is intended to comprise a collection of rasterizable data of at least one page and not more than one job. Job parallelism occurs when a job is smaller than the maximum chunk size, page parallelism occurs when the minimize chunk size is 0 (bytes/pages).

With reference to FIGS. 1-4, illustrated is a Page Parallel RIP system according to this disclosure. Substantially, the Page Parallel RIP system includes a client workstation 10, a Page Parallel Digital Front End (DFE) and a plurality of image marking engines (IMEs), i.e. IME 11 and IME 12. In operation, the DFE receives print jobs from the client workstation 10, processes the print jobs into printer-ready job chunks according to the destination IME associated with the job chunk, and finally, the job chunks are printed on one of the IMEs 11 and 12.

Figure 1:
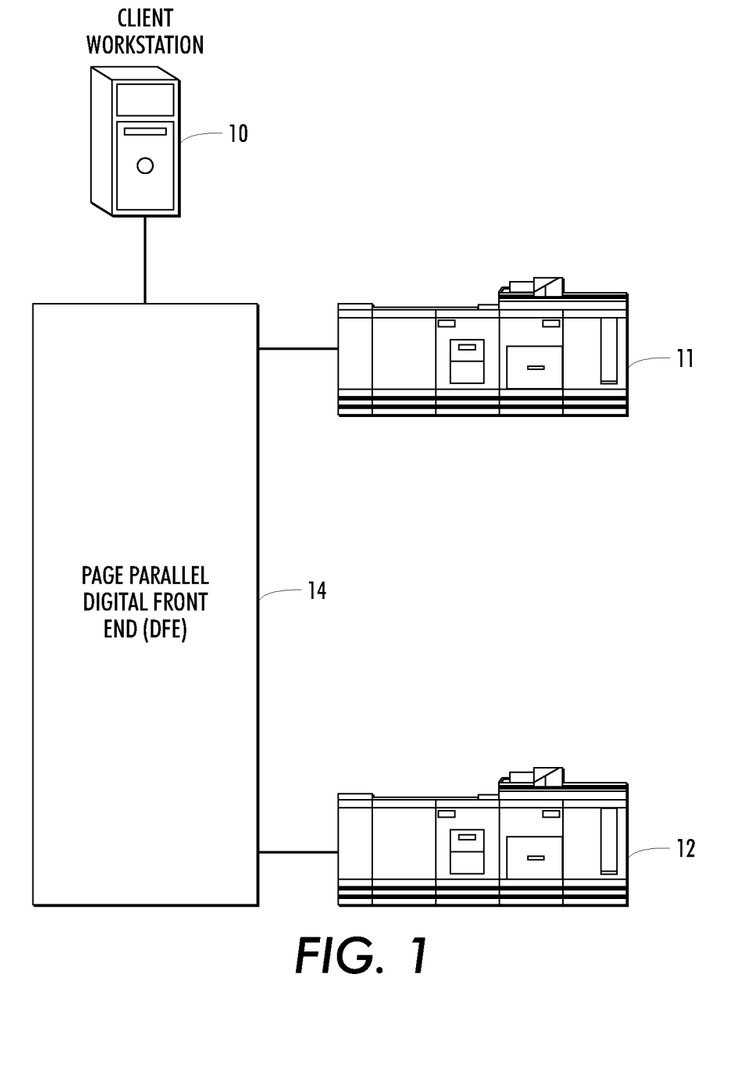
FIG. 1 is a block diagram of a printing system according to an exemplary embodiment of this disclosure.

DFE processing of the print jobs includes splitting a print job into a plurality of job chunks, each job chunk including one or more pages to be printed using only one of the destination IMEs 11 and 12; assigning each of the job chunks to one of a plurality of RIP nodes associated with the job chunk's respective destination IME; and processing the job chunks into a printer ready format.

Figure 2:
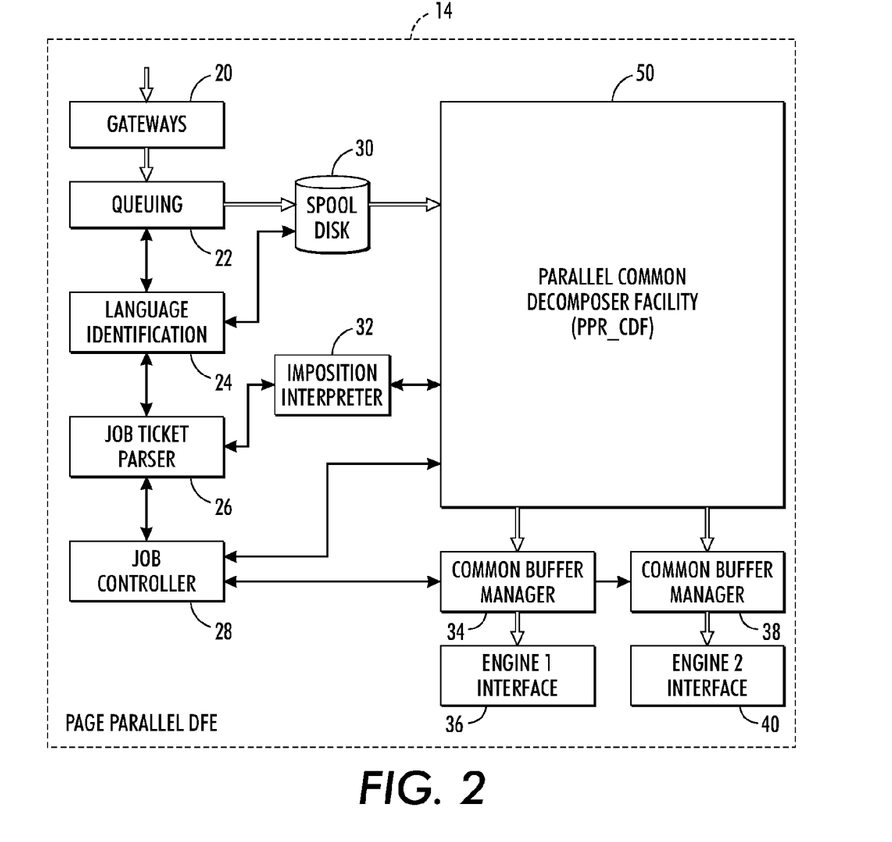
FIG. 2 is a block diagram illustrating the architecture for control and data flow of the printing system of FIG. 1.

With reference to FIG. 2, illustrated is a page parallel RIP system according to this disclosure, documents are received by a spooling system, which includes gateways 20, for communication with one or more client workstations 10, a queuing system 22, for ordering processing of individual jobs, a language identification module 24, for identifying the language of each job, a spool disk 30 for storing jobs not run in "streaming mode", and a job ticket parser 26 for determining any special job parameters that may have been set as part of the submission process.

Job ticket information extracted by Job ticket parser 24 is used by imposition interpreter 32 to provide information to PPR_CDF subsystem 50 about the layout of individual logical pages on a physical sheet. (Imposition is the process of combining logical pages to form a physical page—a simple example of imposition is what is commonly known as 2-up printing, in which two logical pages are printed side by side on the same sheet).

Job controller 28 communicates with PPR_CDF 50 to inform it of jobs to be processed, while PPR_CDF 50 informs it of pages completed. Job Controller 28 informs a common buffer manager (34 or 38) as appropriate so that the correct common buffer manager can take completed pages from PPR_CDF 50, and send them to the appropriate engine interface 36 or 40.

Figure 3:
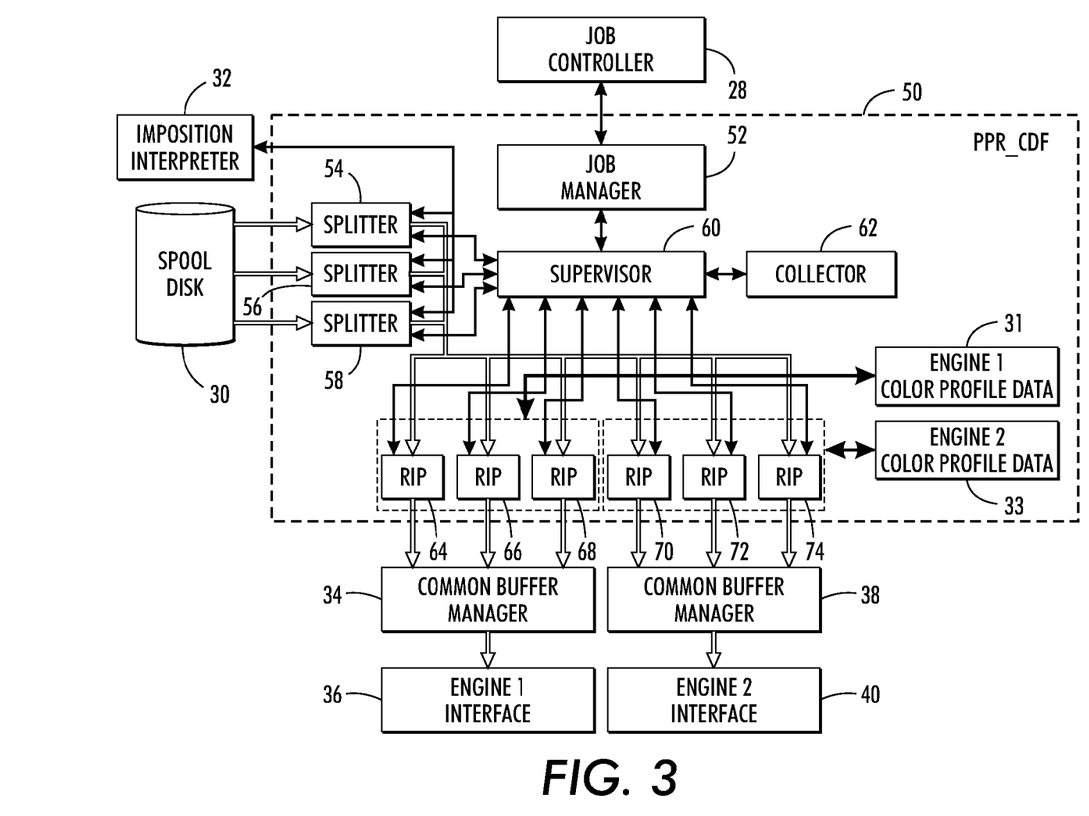
FIG. 3 is a block diagram illustrating the architecture for control and data flow of the PPR_CDF of FIG. 2.

Turning now to FIG. 3, PPR_CDF 50 is shown. When job controller 28 is ready to send a job to PPR_CDF 50, it informs job manager 52 of the job information. Job manager 52 informs supervisor 60 of the job parameters and waits for further information.

Subsequently, the document is routed to a language-specific splitter 54, 56, or 58, under control of supervisor 60. The splitter receives "chunk destinations" from the supervisor, which allocates work among the RIPs (46-74) under its control. The splitter then directly transmits chunks to the RIPs according to the destinations it receives from the supervisor. RIPs report completion to the supervisor, which notifies a collector 62. The collector re-orders completion messages so that the pages appear to be completed in order from first to last, and informs the supervisor of pages completions in the correct order. The supervisor then informs job manager 52, which informs job controller 28 as page images become ready.

In some prior art systems, the splitter generates chunks that are a contiguous series of pages. In the present disclosure and embodiments herein, chunks comprise series of pages that all will be printed on the same engine. For example, on a series-duplex (such as continuous feed) system, chunks include odd-numbered pages or even-numbered pages, but not both.

To further describe the present disclosure and embodiment herein, while prior page parallel systems have a number N of RIPs which is optimized for the amount of hardware present, and the supervisor process attempts to keep them all busy, in the present disclosure, there can be as many RIPs as N per print engine system. However, the supervisor process attempts to keep only N of them busy. Therefore, in the serial-duplex case, there are 2N RIPs and N of them are busy.

Half of the 2N RIPs may be configured to run front sides, and half may be configured to run back sides. Notably, if the front sides are substantially harder to RIP, more than half of the RIPs actually running at a given time could be front-side RIPs. If there are enough available RIPs, they could all be ripping front sides simultaneously. In a distributed parallel system, each node has RIPs configured for each engine.

In one exemplary embodiment of this disclosure, color profiles 31 and 33 associated with the respective IME are stored in a database. In the multiple-engine variant of this disclosure, there is one database per engine, and the RIPs are configured for the engine to include reading the corresponding database.

In another exemplary embodiment of this disclosure, Post-RIP imposition is implemented into the DFE. Notably, it is not always possible to know whether a given logical page is on the front or back of a given physical sheet—that is, without understanding the subsequent imposition. For example, consider the case of a four-page newsletter printed on a single sheet of A3 paper and folded. The layout of such a sheet is on side one, pages 4 and 1, and on side two, pages 2 and 3. Parity of page number is not adequate to determine on which side of the sheet a page lands. In such a system, imposition information must also be communicated to the splitter, so it knows which are front side pages and which are back side pages. This can come in a number of forms, including a simple string describing the repeat pattern. So, for instance in a book made of signatures folded twice and then cut (eight virtual pages to a sheet), pages 1, 4, 5 and 8 are on the first side, and 2, 3, 6 and 7 are on the second side, and then 9, 12, 13, and 16 are on the first side, and 10, 11, 14, and 15 are on the second, and so on. This can be encoded as FRRFFRRFFRRFFRRF . . . , or simply F(RRFF)*, with the repeat pattern stopping when the splitter runs out of pages. Decoding such information is straightforward; generating it requires a function or process that interacts with an imposition library to convert imposition instructions into a stream of page sides.

The disclosed imposition system operates in terms of logical and physical pages, where a logical page contains the information that, after cutting and/or binding, would appear on one flat surface of a sheet of paper, while a physical page contains one or more logical pages that appear on the same side of the same sheet of paper. In the case of a continuous feed system, a physical page is a contiguous region of the web that, except for being physically connected to the rest of the roll, is like a single sheet of a cut-sheet system.

Finally, after the RIP, page complete messages go to the collector for serializing, and thence to the supervisor to send back to the rest of the system, which behaves as if it has one very fast RIP. Where pages are going to more than one printer, the system is split here by printer. Thus, instead of sending pages to a single common buffer manager which communicates with a printer controller, pages are sent to one common buffer manager per engine, which then communicates with its corresponding printer controller. Sending pages to respective buffers per engine is more efficient than merging all pages together and then splitting them by printer.

The information from the imposition interpreter can either be summarized and then passed to the supervisor and thence to the splitter, (i.e., a push model, as described above), or the splitter could query the imposition interpreter to obtain such information (i.e., a pull model).

In the push model, the imposition interpreter informs the supervisor once of the pattern of logical pages, including, if needed, not only which logical pages are to be printed by which engine, but also, geometrical information regarding these logical pages' placement and orientation. The supervisor, by virtue of knowing the resources available to each RIP node (in particular, how many RIPs may run simultaneously), determines what fraction of a physical page should comprise a chunk.

In the pull model, the splitter sends a message to the imposition interpreter to determine on which physical page each logical page belongs. The supervisor informs the splitter of available RIP nodes (normally in advance of their becoming available, in order of increasing estimated time until available). Because any physical RIP node contains multiple RIPs, only a fraction which are active, and some of them are configured for each engine, a portion of the communication sequence can look like the following exemplary arrangement for the pull model:

1) Supervisor to splitter: "ChunkDestination: 1"
2) Supervisor to splitter: "ChunkDestination: 2"
3) Splitter to imposition interpreter: "EngineRequest: 1"
4) Imposition interpreter to splitter: "EngineAssignment: a"
5) Splitter to imposition interpreter: "EngineRequest: 2"
6) Imposition interpreter to splitter: "EngineAssignment: b"
7) Splitter to imposition interpreter: "EngineRequest: 3"
8) Imposition interpreter to splitter: "EngineAssignment: b"
9) Splitter to supervisor: "ChunkReady: 2b"
10) Splitter to imposition interpreter: "EngineRequest: 4"
11) Imposition interpreter to splitter: "EngineAssignment: a"
12) Splitter to supervisor: "ChunkReady: 1a"

Here the splitter adds engine information to the chunk destination, so that the supervisor informs the right RIP to work on the chunk.

In the push model, the equivalent sequence of messages can be made simpler:

1) Supervisor to imposition interpreter: "EngineSequenceRequest"
2) Imposition interpreter to supervisor: "EngineSequence: abba"
3) Supervisor to splitter: "EngineSequence: abba"
4) Supervisor to splitter: "ChunkDestination: 1a"
5) Supervisor to splitter: "ChunkDestination: 2b"
6) Splitter to supervisor: "ChunkReady: 2b"
7) Splitter to supervisor: "ChunkReady: 1a"

An advantage of the pull model is that imposition interpreter is simpler—it doesn't need to re-encode imposition instructions into a single string. In addition, if the RIP needs imposition information, it can ask separately. An advantage of the push model is that fewer messages are needed, and the imposition interpreter is only briefly in the critical path of a job getting through, and with multiple jobs in the system, that can be overlapped, whereas with the pull model, the imposition interpreter is called on with every page to supply engine information to the splitter.

The aforementioned describes a page parallel system including at least two print engines, and at least two RIPs, with each RIP dedicated to producing logical pages for one of the print engines; an imposition interpreter to identify the correspondence between logical pages and physical pages; a splitter for dividing jobs into chunks of at least one page, all pages of one chunk being destined for the same print engine; and means of communicating between the interpreter and the splitter, the correspondence between logical pages and physical pages.

The imposition interpreter is optional, i.e., in a system without imposition, the same can be achieved by checking parity of the page ('even' pages being back sides and 'odd' pages being front sides).

The present disclosure and embodiments therein address the continuing need for faster printing systems—particularly systems where every page can be color and different.

With reference to FIG. 1, illustrated is a high-level systems view of a printing system constructed according to the present disclosure. While the below description of a preferred embodiment will refer to a commercially-available product, Xerox DocuSP, it will be appreciated that the claimed disclosure shall not be limited to such a specific implementation.

Jobs comprising image data to be printed are submitted from a job submission client 10, which may be any of a large number of computers on a network (not shown). The jobs from the clients 10 are ultimately intended to be printed on high-speed digital printing apparatus 12 and/or 13. Interposed between the client 10 and printing apparatus 12 or 13 is a DFE (Digital Front End) 14. With reference to FIGS. 2 and 3, the DFE 14 includes one or more parallel RIP subsystems indicated as 64, 66, 68, 70, 72, and 74, and buffer managers 34 and 38. In the preferred embodiment of the present disclosure, a print server (not shown) includes certain elements of the commercially-available DocuSP. Buffer managers 34 and 38 collect the image data from subsystem 50 until the respective printing apparatus is ready. Engine interfaces 36 and 40 are intended to represent the software and hardware, which is directly operative of printing apparatus 12 and 13, which provides hardcopy output images.

DFE 14 is responsible for taking image data in a PDL format and for generating the decomposed image data to be printed on printing apparatus 12 and/or 13. DFE 14 includes a plurality of independently-operating RIP nodes (64, 66, 68, 70, 72, and 74) for each printing apparatus 12 and 13 as indicated in FIG. 3. (For purposes of this description, the PDLs discussed in the present embodiment can be generalized into plural "image formats," such image formats including not only PDLs but also other image and information formats such as, but not limited to, TIFF, ASCII, PDF, and facsimile formats.)

To enable parallel processing of page images from RIP nodes 64, 66, 68, 70, 72, and 74 provided are supervisor 60, and splitters 54, 56, and 58. The function of splitters 54, 56, and 58 is to direct the image data from an incoming job ultimately submitted from client 10 and distribute it to the various RIP nodes. These services will ultimately divide the data for the multi-page document into component subsets of data, each subset of data corresponding to one chunk to be printed.

The present disclosure also provides a data queuing 22 capability, the functionality of which is carried out by DFE 14.

Further details of chunk parallel processing may be found in U.S. Pat. No. 7,161,705, the teachings of which are incorporated herein by reference.

Figure 4:
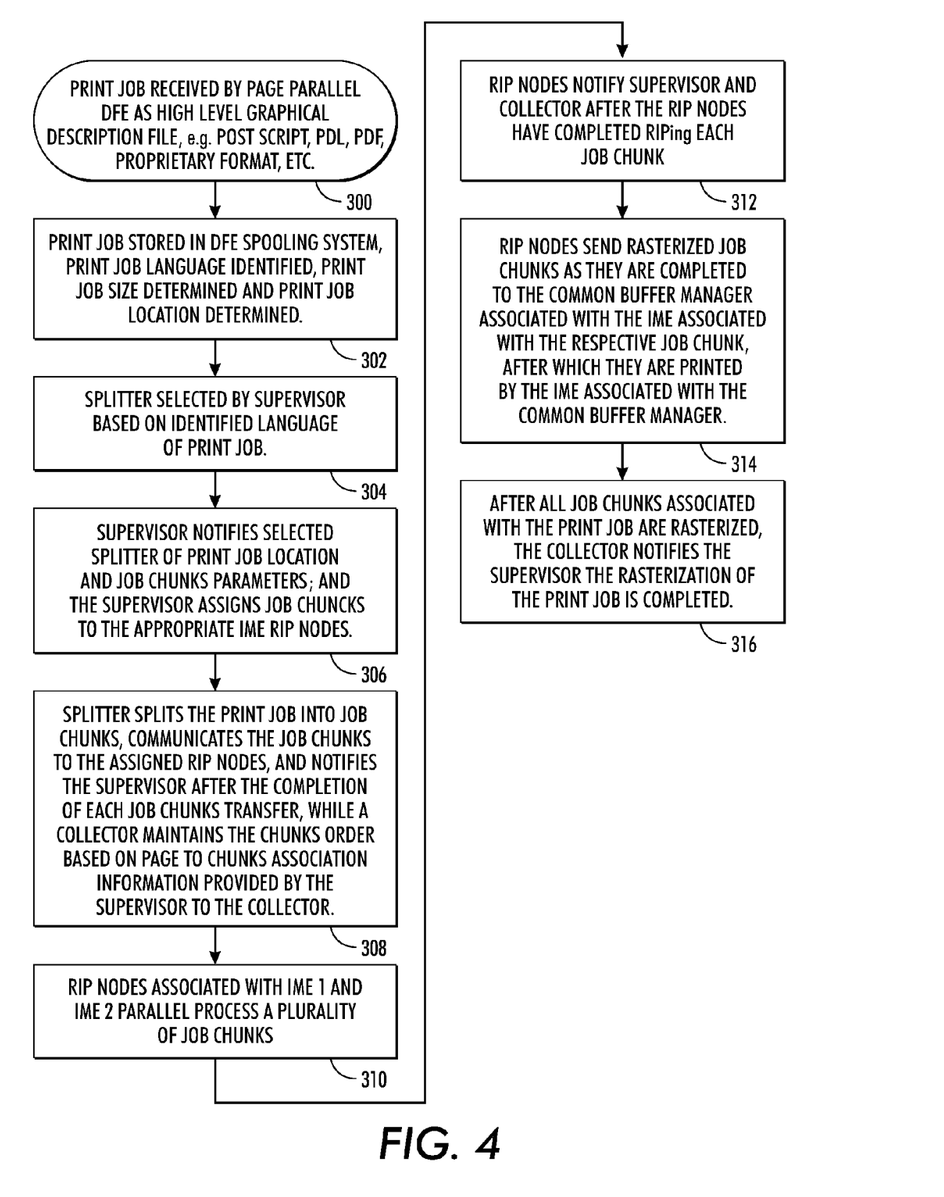
FIG. 4 is a flow chart of a method of operating a printing system according to an exemplary embodiment of this disclosure.

With reference to FIG. 4, illustrated is one exemplary method of operating a Page Parallel RIP Printing System according to this disclosure. Notably, it is to be understood the flow diagram of FIG. 4 is only provided as one exemplary method. Other methods which include an alternative sequencing of the steps illustrated are within the scope of this disclosure and the claims herein. In addition, some of the processing blocks illustrated in FIG. 4 can be simultaneously performed.

Initially, a print job is created and received by the DFE at step 300.

Next, the spooling system associated with the DFE stores the print job at step 302 and the language, size and location associated with the print job is determined.

Next, based on the language of the print, a splitter is selected at step 304.

Next, the supervisor notifies the selected splitter the print job location and chunk parameters, and the supervisor assigns the chunks to respective RIP nodes at step 306.

Next, the selected splitter splits the print job into chunks at step 312.

Next, at step 308, the splitter splits the print job into job chunks, communicates the job chunks to the assigned RIP nodes, and notifies the supervisor after the completion of each job chunk transfer. A collector maintaining the chunk order based on page to chunk association information provided by the supervisor to the collector.

Next, at step 310, the RIP nodes associated with IME 1 and IME 2 parallel process the job chunks. Notably, the RIP nodes associated with IME 1 accesses a color profile/characterization database associated with IME 1 and IME 2 accesses a color profile/characterization database associated with IME 2.

Next, at step 312, the RIP nodes notify the supervisor and/or collector after each RIP node completes RIPping each job chunk.

At step 314, RIP nodes send rasterized job chunks as they are completed to the common buffer manager associated with the IME associated with the respective job chunk, after which they are printed by the IME associated with the common buffer manager.

Finally, at step 316, the collector notifies the supervisor the rasterization of the print job is completed after all job chunks associated with the print job are rasterized.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of operating a printing system for parallel processing a single print job with a plurality of destination image marking engines (IMEs), the single print job including a series of sequential pages and each IME associated with a respective plurality of distinct RIP nodes, the printing system including a total of number of RIP nodes at least equal to N multiplied by a number of the plurality of destination IMES, the method comprising:

splitting the print job into a plurality of job chunks to be printed with the plurality of destination IMEs, each job chunk limited to including one or more pages to be printed using only one of the plurality of destination IMEs;

assigning each of the plurality of job chunks to one of the plurality of RIP nodes associated with the job chunk's respective destination IME for parallel processing of the job chunks into a printer-ready format;

parallel processing the plurality of the respectively assigned job chunks into the printer-ready format using a maximum total of N RIP nodes from an available N RIP nodes per each of the plurality of destination IMEs;

printing the printer-ready job chunks on the respective destination image marking engines; and assembling the printed job chunks from the destination IMEs to provide a sequentially ordered printed version of the single print job including a series of sequential pages;

wherein the plurality of RIP nodes N associated with a first IME are configured according to a first set of color profile data associated with the first IME, and the plurality of RIP nodes N associated with a second IME are configured according to a second set of color profile data associated with the second IME.

2. The method according to claim 1, further comprising:

communicating imposition information regarding a front side and a back side of each page in the print job to a splitter; and using the imposition information to split the print job into the plurality of job chunks.

3. The method according to claim 2, further comprising:

determining a number of logical pages associated with each physical page.

4. The method according to claim 3, wherein a subset of the logical pages is printed on the same side of one physical page.

5. The method according to claim 3, wherein a repeating pattern of logical pages is printed on the same side of a plurality of physical pages.

6. The method according to claim 5, wherein the repeating pattern of logical pages that is printed on the same side of a plurality of the physical pages is determined by the parity of the page number.

7. The method according to claim 3, further comprising:

determining the location on the physical page associated with each logical page.

8. The method according to claim 1, further comprising:

sending a message from a splitter to an imposition interpreter to determine a stream of print page sides.

9. The method according to claim 8, further comprising:

determining the location on the physical pages associated with each logical page and the repeat pattern of the logical pages associated with each side of each of the physical pages.

10. A computer program product comprising:

a non-transitory computer usable data carrier storing instruction that, when executed by a computer, cause the computer to perform a method of operating a printing system for parallel processing a single print job with a plurality of destination image marking engines (IMEs), the single print job including a series of sequential pages and each IME associated with a respective plurality of distinct RIP nodes, the printing system including a total of number of RIP nodes at least equal to N multiplied by a number of the plurality of destination IMES, the method comprising:

splitting the print job into a plurality of job chunks to be printed with the plurality of destination IMEs, each job chunk limited to including one or more pages to be printed using only one of the plurality of destination IMEs;

assigning each of the plurality of job chunks to one of the plurality of RIP nodes associated with the job chunk's respective destination IME for parallel processing of the job chunks into a printer-ready format;

simultaneous parallel processing the plurality of the respectively assigned job chunks into the printer-ready format using a maximum total of N RIP nodes from an available N RIP nodes per each of the plurality of destination IMEs;

printing the printer-ready job chunks on the respective destination image marking engines; and assembling the printed job chunks from the destination IMEs to provide a sequentially ordered printed version of the single print job including a series of sequential pages;

wherein the plurality of RIP nodes N associated with a first IME are configured according to a first set of color profile data associated with the first IME, and the plurality of RIP nodes N associated with a second IME are configured according to a second set of color profile data associated with the second IME.

11. The computer program product according to claim 10, the method further comprising:

communicating imposition information regarding a front side and a back side of each page in the print job to a splitter; and using the imposition information to split the print job into the plurality of job chunks.

12. The computer program product according to claim 11, further comprising:

determining a number of logical pages associated with each physical page.

13. The computer program product according to claim 12, wherein a subset of the logical pages is printed on the same side of one physical page.

14. A printing system comprising:

a plurality of destination image marking engines (IMEs), each IME associated with a respective plurality of distinct RIP nodes, the printing system including a total of number of RIP nodes at least equal to N multiplied by a number of the plurality of destination IMES, and a controller operatively connected to the plurality of IMEs, the controller configured to execute instructions to perform a method of operating the printing system for parallel processing a print job with a plurality of destination IMEs comprising:

splitting the print job into a plurality of job chunks to be printed with the plurality of destination IMEs, each job chunk limited to including one or more pages to be printed using only one of the plurality of destination IMEs;

assigning each of the plurality of job chunks to one of the plurality of RIP nodes associated with the job chunk's respective destination IME for parallel processing of the job chunks into a printer-ready format;

parallel processing the plurality of the respectively assigned job chunks into the printer-ready format using a maximum total of N RIP nodes from an available N RIP nodes per each of the plurality of destination IMEs;

printing the printer-ready job chunks on the respective destination image marking engines; and assembling the printed job chunks from the destination IMEs to provide a sequentially ordered printed version of the single print job including a series of sequential pages;

wherein the plurality of RIP nodes N associated with a first IME are configured according to a first set of color profile data associated with the first IME, and the plurality of RIP nodes N associated with a second IME are configured according to a second set of color profile data associated with the second IME.

15. The printing system according to claim 14, the method further comprising:

communicating imposition information regarding a front side and a back side of each page in the print job to a splitter; and using the imposition information to split the print job into the plurality of job chunks.

16. The printing system according to claim 14, further comprising:

determining a number of logical pages associated with each physical page.

17. The printing system according to claim 16, wherein a subset of the logical pages is printed on the same side of one physical page.

18. The printing system according to claim 16, wherein a repeating pattern of logical pages is printed on the same side of a plurality of physical pages.

19. The printing system according to claim 18, wherein the repeating pattern of logical pages that is printed on the same side of a plurality of the physical pages is determined by the parity of the page number.

20. The printing system according to claim 16, further comprising:

determining the location on the physical page associated with each logical page.

21. The printing system according to claim 15, further comprising:

sending a message from a splitter to an imposition interpreter to determine a stream of print page sides.

22. The printing system according to claim 21, further comprising:

determining the location on the physical pages associated with each logical page and the repeat pattern of the logical pages associated with each side of each of the physical pages.

* * * * *